United States Patent
Saling et al.

(10) Patent No.: US 6,486,087 B1
(45) Date of Patent: Nov. 26, 2002

(54) METHOD FOR PERIODICALLY REACTIVATING A COPPER-CONTAINING CATALYST MATERIAL

(75) Inventors: Carlo Saling, Dettingen/Teck (DE); Martin Schuessler, Ulm (DE); Thomas Stefanovski, Boeblingen (DE)

(73) Assignee: Xcellsis GmbH, Kirchheim/Teck-Nabern (DE)

( * ) Notice: Subject to any disclaimer, the term of this patent is extended or adjusted under 35 U.S.C. 154(b) by 129 days.

(21) Appl. No.: 09/664,520

(22) Filed: Sep. 18, 2000

(30) Foreign Application Priority Data

Sep. 17, 1999 (DE) .......................... 199 44 536

(51) Int. Cl.$^7$ .......................... B01J 38/12; B01J 20/34; C07C 1/02; C01B 3/02; C01B 3/26
(52) U.S. Cl. .................. 502/38; 252/373; 423/648.1; 423/652; 502/51
(58) Field of Search .............. 423/652, 648.1; 252/373; 502/20, 34, 38, 51

(56) References Cited

U.S. PATENT DOCUMENTS

| | | | | |
|---|---|---|---|---|
| 3,515,514 A | | 6/1970 | Holmes et al. ................ 23/212 |
| 4,089,088 A | | 5/1978 | Konczalski ................... 23/277 |
| 4,533,648 A | | 8/1985 | Corrigan et al. ............... 502/38 |
| 4,623,668 A | * | 11/1986 | Broecker et al. ............. 518/709 |
| 4,777,156 A | * | 10/1988 | Forbus et al. ................. 502/53 |
| 4,816,353 A | | 3/1989 | Wertheim et al. ............. 429/19 |
| 4,855,267 A | | 8/1989 | Cheng ........................ 502/50 |
| 5,001,094 A | * | 3/1991 | Chang et al. ................. 502/26 |
| 5,075,268 A | | 12/1991 | Kurashige et al. ............. 502/52 |
| 5,132,259 A | * | 7/1992 | Curnutt ....................... 502/37 |
| 5,618,954 A | | 4/1997 | Boeck et al. ................ 549/534 |
| 5,691,262 A | * | 11/1997 | Hagemeyer et al. ........... 502/38 |
| 5,762,658 A | | 6/1998 | Edwards et al. ............ 48/127.7 |
| 5,928,985 A | * | 7/1999 | Williams .................... 502/345 |
| 5,939,025 A | | 8/1999 | Ahmed et al. ............... 422/111 |
| 6,074,770 A | * | 6/2000 | Autenrieth et al. ............ 429/19 |
| 6,171,992 B1 | * | 1/2001 | Autenrieth et al. ........... 502/55 |

FOREIGN PATENT DOCUMENTS

| | | |
|---|---|---|
| DE | 1 094 244 | 12/1960 |
| DE | 1 246 688 | 8/1967 |
| DE | 44 23 587 | 1/1996 |
| EP | 0 592 958 | 4/1994 |
| EP | 0 884 271 | 12/1998 |
| EP | 0 924 161 | 6/1999 |
| JP | 62-36001 | 2/1990 |
| JP | 4-200640 | 7/1992 |
| WO | WO99/31012 | 6/1999 |

* cited by examiner

Primary Examiner—Wayne A. Langel
Assistant Examiner—Jonas N. Strickland
(74) Attorney, Agent, or Firm—Crowell & Moring LLP

(57) ABSTRACT

A method for periodically reactivating copper-containing catalyst material includes applying an oxygen-containing gas stream to the catalyst material for reactivation purposes. When the reactor is in the warm operating state, the application of the oxygen-containing gas stream to the catalyst material is interrupted when the monitored temperature of the catalyst material exceeds a maximum level which is a predeterminable tolerance level above a predetermined operating temperature. In cold-start phases, initially a mixture of a fuel and an oxygen-containing gas stream is fed to the catalyst material, until the monitored temperature of the catalyst material exceeds a predeterminable switch-over level, after which only the oxygen-containing gas stream is supplied. To keep the reactor warm after operation has ended, the reactivation can be activated each time the temperature falls below a further threshold level.

14 Claims, No Drawings

METHOD FOR PERIODICALLY REACTIVATING A COPPER-CONTAINING CATALYST MATERIAL

BACKGROUND AND SUMMARY OF INVENTION

This application claims the priority of German patent document 199 44 536.2, filed Sep. 17, 1999, the disclosure of which is expressly incorporated by reference herein.

The present invention relates to a method for periodically reactivating copper-containing catalyst material which is introduced into a reactor for the catalytic conversion of a hydrocarbon or hydrocarbon derivative starting material by an oxidation and/or a reforming conversion reaction and is gradually deactivated by the conversion reaction.

Copper-containing catalyst materials are used, for example, in reactors which are used in fuel cell vehicles for obtaining hydrogen through the catalytic conversion of methanol or the like by a partial oxidation reaction and/or a steam reforming reaction. It is known that the catalyst material is gradually deactivated by the methanol conversion reaction. Various methods for the periodic reactivation of the catalyst material are known to enable it to substantially regain its original activity.

One of these known reactivation techniques comprises applying an oxygen-containing gas stream, e.g. air, to the deactivated catalyst material. It is specifically proposed in DE-B1 246 688 for normal reactor operation, during which steam reforming of methanol is carried out at a temperature of from 150° C. to 400° C. in the reactor, to be periodically interrupted and for the catalyst material to be regenerated (i.e. reactivated) through the application of the oxygen-containing gas stream at a temperature in the range from 150° C. to 450° C. A hydrogen-containing gas stream is then applied to the catalyst material before normal methanol conversion operation continues. In publication JP 4-200642 (A), it is proposed to apply an oxygen-containing gas stream, which contains at most 5 mol % molecular oxygen, at a temperature of between 120° C. and 650° C., to reactivate the copper-containing catalyst material.

U.S. Pat. No. 4,855,267 discloses a two-stage reactivation method in which an oxygen-containing gas stream which contains at least 1 vol % of oxygen is initially applied to a deactivated, copper-containing catalyst material at a temperature of between 275° C. and 400° C., for a period of approximately two hours to eighteen hours. The catalyst material which has been oxidised in this way is then subjected to a reducing treatment in a reducing atmosphere, at a temperature of between 100° C. and 400° C., for a period of approximately two hours to three hours.

DE 1246688 discloses a method for the catalytic steam reforming of methanol. In reaction phases that are periodically interrupted by regeneration phases, the starting steam mixture is catalytically converted at 150° C. to 400° C., preferably at 240° C. to 270° C. In the regeneration phases, the catalyst system, which preferably comprises a nickel catalyst and a zinc-/copper- containing catalyst in separate reactors, is regenerated by treatment with an oxygen-containing gas at elevated temperatures, preferably at temperatures in the range from 150° C. to 450° C. Before the methanol conversion reaction is restarted, it is possible to pass a hydrogen-containing gas across the catalyst beds at elevated temperatures in order to reactivate the nickel catalyst.

DE-B-1094244 describes a method for the regeneration of a catalyst comprising copper and sodium silicate by oxidation of a carbon-containing residue which has been deposited thereon. A hot, oxidizing gas which contains less than 1.5 vol % molecular oxygen is passed over the catalyst, while substantially avoiding condensation of steam, at a temperature which is above 105° C. but below the sintering temperature of the copper, which is dependent on the amount of sodium silicate. The regeneration operation is only ended when the copper has been virtually completely oxidized to form copper oxide. Then, the temperature is increased to a temperature which is above the sintering temperature of copper but below 425° C. and the oxygen-containing gas continues to be passed through.

The present invention is based on the technical problem of providing a method in which a catalyst material that is gradually deactivated in normal operation can be reactivated relatively easily and effectively and which is also eminently suitable for mobile use, for example in fuel cell vehicles, without significantly disrupting driving operation these vehicles.

A method according to the present invention relates specifically to the warm operating state of the reactor containing the catalyst material. An oxygen-containing gas stream is applied to he catalyst material for the purpose of reactivating the catalyst material and is always interrupted at the latest when a monitored temperature of the catalyst material exceeds a maximum level which is more than a predeterminable tolerance level above an operating temperature. The operating temperature that is predetermined for the conversion reaction of the hydrocarbon or hydrocarbon derivative starting material. For example, a reactivation sequence comprises relatively short pulses of the oxygen-containing gas stream being applied to the catalyst material.

The catalyst material heats up as a result of the oxygen-containing gas stream due to exothermic oxidation processes (e.g., oxidation of the copper and/or deposits on the catalyst material). The catalyst material cools back down to below the predeterminable maximum temperature level in the periods between successive pulses of oxygen-containing gas stream. In this way, the catalyst material is prevented from overheating.

In another embodiment of the present invention, an air stream which is diluted with steam is used as the oxygen-containing gas stream for the reactivation of the copper-containing catalyst material. The dilution enables the duration of the individual application cycles of the oxygen-containing gas stream to be lengthened compared to the use of undiluted air or a gas stream with an even higher oxygen content, without the temperature of the catalyst material rising beyond the predetermined maximum level. If appropriate, the dilution may be so great that the entire reactivation operation can be carried out without interrupting the application of the oxygen-containing gas stream to the catalyst material.

Steam may also be used as an intermediate purge media before and/or after the application of the oxygen-containing gas stream. In this way, it is possible to prevent oxygen and the starting material which is to be catalytically converted from coming together in exothermic stoichiometric proportions which, as a result of oxidation of starting material, would lead to even more intensive heating of the catalyst material. Particularly in the case of mobile use in fuel cell vehicles, the use of water as a diluting medium or intermediate purge medium has the advantage of it already being present for the steam reforming reaction of the starting material, such as for example methanol.

When a reactor is used in a vehicle, the reactivation is preferably started when a refuelling operation is detected.

Since a refuelling operation requires a predictable time, there is no need to worry about the reactivation interfering with normal operation. Alternatively, of course the reactivation can be initiated by the driver.

The method according to the present invention may also be used for cold-start phases of the reactor. In this case, a mixture of a fuel and an oxygen-containing gas stream is initially applied to the catalyst material, resulting in exothermic oxidation of the fuel and, at the same time, oxidation of the catalyst and/or deposition on the catalyst. As a result of the two exothermic processes, the catalyst material relatively quickly reaches a temperature at which the catalyst oxidation and/or the oxidation of the deposits can take place with sufficient efficiency, after which the supply of the fuel is ended and only the oxygen-containing gas stream is applied to the catalyst material. The temperature at which the change to only the oxygen-containing gas stream is supplied is typically significantly below the operating temperature level for the normal catalytic conversion reaction of the starting material. The supply of the oxygen-containing gas stream is ended at the latest when the monitored temperature of the catalyst material exceeds the predeterminable maximum level, provided that the reactivation operation has not already been terminated as a result of the catalyst material having regained its fresh, reactivated state.

In another embodiment of the present invention, the oxygen content in the mixture which is initially supplied to the catalyst material is set at significantly superstoichiometric proportions. Furthermore, it may be advantageous for the stoichiometry of the gas stream not to be suddenly switched over from a predetermined level to zero, but rather for the stoichiometry to be changed as early as during the cold-start phase. In this case, the ratio between the mass flow rate of fuel $F_B$ and the mass flow rate of oxygen $F_O$. may range from substoichiometric combustion ($F_B/F_O>2/3$ with methanol as the fuel) to a fuel-free gas mixture ($F_B/F_O=0$) and may be set variably during start-up.

In a further embodiment of the reactivation method for reactor cold-start phases, the temperature switch-over level for switching over to supplying only the oxygen-containing gas stream is in the range between 100° C. and 200° C., preferably in the region of 150° C. This temperature is still significantly below the typical operating temperature level of approximately 200° C. to 350° C. for a steam reforming of methanol.

Further, when the method starts, it is additionally possible to record the temperature of the catalyst material and to compare it with a second, lower threshold. When the temperature exceeds this second threshold, the method is started directly through the addition of the oxygen-rich gas stream. This delineation between a cold start and a warm start makes it possible to save fuel.

Another embodiment of the present invention keeps a reactor warm after operation has ended. In this case, the temperature of the catalyst material is continually monitored. Whenever the temperature falls below a third, lower threshold, an oxygen-containing gas stream is applied to the catalyst material until the monitored temperature of the catalyst material exceeds the predeterminable maximum level. The third, lower threshold is selected such that spontaneous oxidation with the oxygen-containing gas stream is ensured. With this method, it is possible to keep the reactor warm during prolonged pauses without consuming fuel.

The tolerance level by which the maximum temperature of the catalyst material may exceed the normal temperature level of the fuel conversion during the reactivation is fixed to at most approximately 100 K, preferably at most approximately 20 K. This allows the normal operating temperature of the catalyst material to be exceeded for short times without damage while it is being reactivated.

Advantageous ways of realizing the method according to the present invention are described below by way of example and to represent further ways which will become obvious to the person skilled in the art employing the teaching according to the invention. The examples of the method can be used in particular for periodic reactivation of a copper-containing catalyst material which is situated in a reforming reactor of a fuel cell vehicle. Mobile reforming reactors of this type are used to obtain the hydrogen which is required for the fuel cells from methanol or another hydrocarbon or hydrocarbon derivative fuel, with the participation of steam, by an oxidation and/or reforming reaction.

DETAILED DESCRIPTION OF THE INVENTION

In the warm operating state of a reactor (for example, in the case of a fuel cell vehicle while the vehicle is in operation), a periodic reactivation of the catalyst material can be carried out such that normal reactor operation, for example steam reforming of methanol at an operating temperature level of between approximately 200° C. and 350° C., is interrupted.

Short pulses of air are applied to the catalyst material. The duration of the short pulses is selected such that the monitored temperature of the catalyst material at the end of each air pulse is not above a maximum level, which is a predeterminable tolerance level above the operating temperature for the normal conversion reaction of the starting material. This tolerance level is preferably no higher than approximately 100 K and more preferably no higher than approximately 20 K. The result is typical maximum durations of the air pulses of no more than a few tens of seconds, often of less than ten seconds.

Between successive air pulses, the catalyst material, which heats up as a result of the influence of the reactivating oxygen, cools back down sufficiently to below the predetermined maximum level. It is additionally possible for the next air pulse to be administered only when the monitored temperature of the catalyst material falls below a first threshold.

As an alternative to using pure air, it is possible to use an air stream which is diluted with steam as the oxygen-containing gas stream for the reactivation of the catalyst material. Due to the lower oxygen content, it is possible to lengthen the duration of the individual air pulses or cycles of air without the temperature of the catalyst material rising beyond the maximum level. The temperature rise of the catalyst material can be regulated by suitably controlling the dilution with steam. If required, the dilution may be so great that during a reactivation operation, rather than successive pulses, the diluted air stream is applied without interruption to the catalyst material without the temperature of the catalyst material exceeding the maximum level.

Before and/or after each air purge operation, the catalyst material is subjected to an intermediate purge with steam, in each case for a short time, typically for a few seconds, in order to prevent oxygen and starting material from coming into contact with one another in exothermic stoichiometric amounts, which would cause the catalyst material to heat up further, which is undesirable.

The air purge operation is in each case preferably followed by a reduction operation in which the catalyst material is exposed to a water/fuel mixture. Since this operation is also exothermic, for a short time a water/fuel ratio which is higher than during standard steam reforming operation is supplied and thus the temperature increase is limited.

When used in a mobile situation, a reactivation operation can be initiated specifically at the end of each journey, when the catalyst material begins to cool down to below normal operating temperature level. The reactivation operation may comprise (1) individual, diluted or undiluted, air pulses with cooling phases between them; or (2) a continual supply of steam-diluted air. Each reactivation cycle is interrupted, for example, when the temperature of the catalyst material has reached the operating temperature, but at the latest when it exceeds the predetermined maximum level. When the vehicle is at a standstill, the reactivation cycles can be repeated as often as desired in order to improve the gain in activity for the catalyst material.

Water can be used both for dilution and as an intermediate purge medium and for accelerated cooling of the catalyst material. Preferably, means for detecting refuelling operations are provided, and a reactivation operation is initiated whenever a refuelling operation is commenced. Refuelling operations are carried out at regular intervals as a function of the operating period of the reactor and at the same time ensure that once the reactivation operation has been initiated, neither the vehicle nor the reactor is started. However, it is also possible for the driver to initiate a reactivation operation, for example using a suitable switch.

If necessary, the reactivation operation can be repeated a number of times, for example overnight, until a subsequent journey begins. This has the additional effect that even at the start of the journey the reactor system is in the warm operating state. In this case, it is necessary to ensure that the catalyst material does not fall below a temperature at which fuel would additionally be required in order to return the catalyst material to operating temperature. Whenever the temperature falls below a third, lower threshold, an oxygen-containing gas stream is applied to the catalyst material until the monitored temperature of the catalyst material exceeds the predeterminable maximum level. In this case, the third, lower threshold is selected such that spontaneous oxidation with the oxygen-containing gas stream is ensured. With this method, the reactor can be kept warm during prolonged breaks without consuming fuel.

In the case of a cold start of the reactor system (for example in the event of a cold start of a fuel cell vehicle), a reactivation operation for the catalyst material can be combined with the desired measure of bringing the reactor system up to operating temperature as quickly as possible. To do this, the reactor is started using exothermic oxidation of the fuel with an air purge which is integrated into this start-up or warm-up phase of the reactor.

For this purpose, after the reactor has been started, initially a mixture of fuel and air is fed to the catalyst material. If methanol is used as the fuel, the oxygen excess coefficient is typically selected to be greater than 1.4, and preferably greater than 1.5. As a result, at least partial reactivation of the catalyst material already takes place, specifically in the zones through which the oxygen-containing intermediate product mixture flows after consumption of the starting material. The stoichiometry can also be varied during the cold-start phase.

When, in this way, the temperature of the catalyst material exceeds a predetermined switch-over level, the supply of the air-fuel mixture is terminated and then only air is supplied. The switch-over takes place in a temperature range beyond which the oxidation of the catalyst material and/or the deposits on the catalyst material is so active that further heating can take place without the addition of fuel. The intensified oxidation of the catalyst material which results leads to a further rise in the temperature of this material. It is permissible for the temperature of the catalyst material to rise briefly beyond normal operating temperature level, which is typically in the range between 200° C. and 350° C., but by no more than the predetermined tolerance level of, for example, at most 100 K and preferably 20 K. The switch to the supply of pure air takes place, for example, when a switch-over level which is between 100° C. and 200° C., preferably approximately 150° C., is reached.

As has been stated, there are further possible ways for the person skilled in the art to realize the method according to the invention, in addition to the embodiments which have been described in more detail above. In each case, the procedure according to the invention is distinguished by the fact that, in addition to the starting material, only an oxygen-containing gas stream, such as air, and optionally water are required. These substances are already available in reforming units as are fitted, for example, in fuel cell vehicles. As a further advantage, the catalyst reactivation method according to the invention does not particularly restrict the use of the fuel cell vehicle; in particular, the reactivation operations can be carried out during driving operation and/or while the vehicle is at a standstill.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for periodically reactivating copper-containing catalyst material in a reactor for the catalytic conversion of a hydrocarbon or hydrocarbon derivative starting material, said method comprising:

when the reactor is in an operating state, applying an oxygen-containing gas stream to the catalyst material intermittently during a plurality of catalyst reactivation intervals; and terminating each catalyst reactivation interval when a monitored temperature of the catalyst material exceeds a maximum temperature which is a predetermined tolerance level above an operating temperature, thereby allowing the catalyst material to cool.

2. A method according to claim 1, wherein after a reactivation interval, a successive reactivation interval is started when the monitored temperature of the catalyst material falls below a first threshold.

3. A method according to claim 1, wherein the oxygen-containing gas stream is an air stream diluted with steam.

4. A method to claim 1, further comprising purging the catalyst material with steam at least one of before or after each application of the oxygen-containing gas stream to the catalyst material.

5. A method according to claim 1, wherein the reactor is in a vehicle, and said applying of the oxygen-containing gas stream is started by detection of a refuelling operation or by a driver of the vehicle.

6. A method according to claim 1, wherein the tolerance level is at most approximately 100 K.

7. A method according to claim 1, wherein the tolerance level is approximately 20 K.

8. A method for periodically reactivating copper-containing catalyst material in a reactor for the catalytic conversion of a hydrocarbon or hydrocarbon derivative starting material, comprising:

in reactor cold-start phases, applying a mixture of a fuel and an oxygen-containing gas stream to the catalyst material until a monitored temperature of the catalyst material exceeds a predetermined switch-over level;

stopping the feed of the fuel, thereby only applying the oxygen-containing gas stream to the catalyst material; and interrupting the applying of the oxygen-containing gas stream at the latest when a temperature of the catalyst material exceeds a maximum level which is a predetermined tolerance level above a predetermined operating temperature.

9. A method according to claim 8, wherein the mixture of fuel and oxygen-containing gas stream contains oxygen in a superstoichiometric proportion.

10. A method according to claim 8, further comprising varying the stoichiometry of the mixture of fuel and oxygen-containing gas stream.

11. A method according to claim 8, wherein the switch-over level is between 100° C. and 200° C.

12. A method according to claim 8, wherein the switch-over level is approximately 150° C.

13. A method according to claim 8, further comprising:

during start-up, recording the temperature of the catalyst material and comparing the recorded temperature with a predetermined temperature; and when the recorded temperature of the catalyst material is above the predetermined temperature, adding the oxygen-containing gas stream.

14. A method for periodically reactivating copper-containing catalyst material in a reactor for the catalytic conversion of a hydrocarbon or hydrocarbon derivative starting material, said method comprising:

recording the temperature of the catalyst material continually even after operation of the reactor ends;

comparing the recorded temperature with a predetermined temperature;

when the recorded temperature falls below the predetermined temperature, supplying an oxygen-containing gas stream to the catalyst material; and interrupting the supplying of the oxygen-containing gas stream when the temperature of the catalyst material exceeds a maximum temperature which is a predetermined tolerance level above a predetermined operating temperature.

* * * * *